United States Patent Office 3,644,347
Patented Feb. 22, 1972

3,644,347
3-AMINOMETHYL CEPHALOSPORIN COMPOUNDS
J. Alan Webber and Earle M. van Heyningen, Indianapolis, Ind., assignors to Eli Lilly and Company, Indianapolis, Ind.
No Drawing. Continuation-in-part of application Ser. No. 703,523, Feb. 7, 1968. This application Feb. 26, 1969, Ser. No. 802,644
Int. Cl. C07d 99/24
U.S. Cl. 260—243 C
3 Claims

ABSTRACT OF THE DISCLOSURE

A new class of metabolically stable cephalosporin compounds is disclosed. These compounds have an aliphatic aminomethyl group in the 3-position of the molecule.

CROSS-REFERENCE

This application is a continuation-in-part of our copending application Ser. No. 703,523, filed Feb. 7, 1968, now abandoned.

BACKGROUND OF THE INVENTION

This invention relates to a new class of metabolically stable cephalosporin compounds substituted in the 3-position with an aliphatic aminomethyl group.

The cephalosporins constitute a well-recognized family of antibiotics and a number of representatives of this family are widely used in the treatment of disease. The first members of this family were obtained from cephalosporin C, a fermentation product, or from penicillin in accordance with the process described in Morin and Jackson U.S. Pat. 3,275,636. These early cephalosporins were substituted in the 3-position with a methyl or acetoxymethyl group.

It has long been recognized that improved antibiotics might be obtained by the introduction of other substituents in the 3-position. Therefore considerable effort has been devoted to the preparation of various 3-substituted cephalosporins.

SUMMARY OF THE INVENTION

We have now obtained a new class of cephalosporin antibiotics wherein the substituent at the 3-position is an alkyl aminomethyl group. This amino nitrogen atom is substituted with one or two $C_1$ to $C_6$ alkyl groups or is a part of a pyrrolidino, piperidino, or morpholino ring. Also included within the scope of our invention are certain salts or quaternary ammonium salts of our amino compounds. These salts are those obtained by treating the amino cephalosporanic acid or ester with an acid having a pKa of less than 4 or a $C_1$ to $C_6$ alkylating agent such as a $C_1$ to $C_6$ alkyl halide or sulfate.

DESCRIPTION OF THE PREFERRED EMBODIMENT

The novel 3-aminomethyl cephalosporin compounds of our invention are those represented by the formula

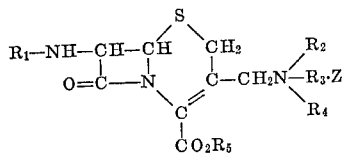

wherein:

$R_1$ is hydrogen, hydrogen and a $C_6$ to $C_{12}$ hydrocarbon sulfonic acid,

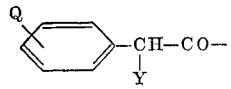

or

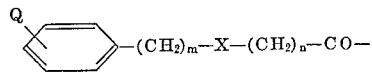

Q is hydrogen, hydroxy, chloro, bromo, $C_1$ to $C_2$ alkoxy, nitro, or cyano;
Y is hydroxy, amino and pharmaceutically acceptable salts thereof, or protected amino;
m is an integer of 0 to 2;
n is an integer of 1 to 2;
X is oxygen or sulfur;
$R_2$ is hydrogen or $C_1$ to $C_6$ alkyl and $R_3$ is $C_1$ to $C_6$ alkyl or $R_2$ and $R_3$ taken together with the nitrogen to which they are bonded complete a pyrrolidino, piperidino, or morpholino ring;
$R_4$ is absent or is hydrogen or $C_1$ to $C_6$ alkyl;
Z is absent when $R_4$ is absent and is the anion of an acid having a pKa of less than 4 when $R_4$ is present; and
$R_5$ is hydrogen, a pharmaceutically acceptable cation, $C_4$ to $C_6$ t-alkyl, $C_5$ to $C_8$ t-alkenyl, $C_5$ to $C_8$ t-alkynyl, benzyl, methoxybenzyl, nitrobenzyl, benzhydryl, phthalimidomethyl, succinimidomethyl, trimethylsilyl, or phenacyl.

When $R_1$ in the above formula is hydrogen there is a free amino group in the 7-position. When $R_1$ is hydrogen and a hydrocarbon sulfonic acid the amino group in the 7-position exists as a salt of the sulfonic acid. It will be recognized that when both $R_1$ and $R_5$ are hydrogen a zwitterion will exist. This zwitterion form of the compounds is included as a part of this invention.

The more antibiotically active compounds of our invention are those in which $R_1$ is one of the acyl groups described above. Thus, for example, $R_1$ may be such groups as phenylglycyl, methoxyphenylglycyl, nitrophenylglycyl, 2-phenyl-2-hydroxyacetal, phenylacetyl, chlorophenyl-2-phenyl-2-hydroxyacetal, phenylacetyl, chlorophenylacetyl, phenoxyacetyl, cyanophenoxyacetyl, benzyloxyacetyl, and phenylpropionyl. When an amino group is present it may be protected by well-known groups such as t-butyloxycarbonyl, benzyloxycarbonyl, or 2,2,2-trichloroethoxycarbonyl.

The 3-aminomethyl group of our compounds is one in which the nitrogen atom is substituted with one or two alkyl groups of from 1 to 6 carbon atoms or is a part of a pyrrolidino, piperidino, or morpholino ring. Thus our compounds are substituted in the 3-position with such groups as methylaminomethyl, ethylaminomethyl, hexylaminomethyl, dimethylaminomethyl, diethylaminomethyl, methylethylaminomethyl, dihexylaminomethyl, piperidinomethyl, and pyrrolidinomethyl. In addition, salts, or quaternary salts of these amino groups may be prepared by reaction with an acid having a pKa of less than 4 or a $C_1$ to $C_6$ alkylating agent. For example, a salt may be prepared by reaction with such compounds as hydrochloric acid, methyl iodide, ethyl sulfate, or amyl nitrate. When such salts are prepared $R_4$ would be respectively hydrogen, methyl, ethyl, or amyl while Z would be such groups as chloride, iodide, sulfate, or nitrate.

The most active compounds of our invention are those in which $R_5$ is hydrogen, i.e., the carboxylic acids, or a pharmaceutically acceptable cationic salt of the acids such as the sodium, potassium or ammonium salts. In the preparation of the acids it is frequently necessary to protect the carboxyl group by esterification. The esterifying group is usually one that can be easily removed to regenerate the acid. Typical of such groups are t-butyl, t- amyl, t-hexyl, 1,1-dimethyl-2-propenyl, 1,1-dimethyl-2-pentynyl, benzyl, p-methoxybenzyl, p-nitrobenzyl, benzhydryl or phenacyl.

Typical examples of specific compounds of our invention are listed below:

3-dimethylaminomethyl-7-(α-amino-α-phenyl)acetamido-$\Delta^3$-cephem-4-carboxylic acid;

3-hexylaminomethyl-7-(2-phenyl-2-hydroxy)acetamido-$\Delta^3$-cephem-4-carboxylic acid;

t-butyl 3-dimethylaminomethyl-7-(α-amino-α-phenyl) acetamido-$\Delta^3$-cephem-4-carboxylate;

p-nitrobenzyl 3-piperidinomethyl-7-phenoxyacetamido-$\Delta^3$-cephem-4-carboxylate;

3-diethylaminomethyl-7-amino-$\Delta^3$-cephem-4-carboxylic acid bis-p-toluenesulfonate;

benzhydryl 3-diamylaminomethyl-7-(p-methoxyphenyl) acetamido-$\Delta^3$-cephem-4-carboxylate; and 3-pyrrolidinomethyl-7-phenylacetamido-$\Delta^3$-cephem-4-carboxylic acid hydrochloride.

The novel feature of our invention lies in the substituents in the 3-position. The $R_1$ and $R_5$ substituents may be any of those well known in the cephalosporin art. One skilled in the cephalosporin art can choose the proper $R_1$ and $R_5$ substituents to give the desired antibiotic activity with the particular aminomethyl group present in the 3-position.

Our compounds can be prepared from a penicillin starting material such as penicillin V by a multistep process beginning with the process described in Morin and Jackson U.S. Pat. 3,275,636 for the conversion of a penicillin sulfoxide ester to a desacetoxy cephalosporanic acid ester. The double bond in the 3-position of this desacetoxy cephalosporin ester is then isomerized to the 2-position and the 3-methyl group is brominated by treatment with N-bromosuccinimide. Treatment of the 3-bromomethyl compound with a primary or secondary amine results in the formation of the 3-aminomethyl derivative which can be separated from impurities by acid extraction. The double bond in the 2-position of the amino ester recovered from the acid extract can then be isomerized to the 3-position by either base isomerization or oxidation to the sulfoxide followed by the reduction of the sulfoxide to yield the $\Delta^3$ cephalosporin ester. The acyl group in the 7-position which was carried over from the penicillin starting material can be removed by reaction with phosphorus pentachloride in the presence of a tertiary amine followed by treatment with a lower alkanol, then with water or aqueous acid to form the 7-amino ester compound. The 7-amino group can be reacylated with the desired acyl group using procedures well known to those skilled in the art. The particular ester group employed can then be removed to yield the free acid.

The preparation of the compounds of our invention will be further illustrated by the following examples.

EXAMPLE 1

A suspension of 0.353 g. of 3-methyl-7-phenoxyacetamido-$\Delta^3$-cephem-4-carboxylic acid (prepared as described in U.S. Pat. 3,275,636) in 40 ml. of benzene was cooled in an ice bath and stirred while 0.256 g. of oxalyl chloride and 1 drop of dimethylformamide were added. The reaction mixture was stirred at about 5° C. for 45 minutes and the solvent removed under reduced pressure to yield the desired acid chloride of the starting $\Delta^3$-cephem acid.

EXAMPLE 2

A solution of 1.75 g. of the acid chloride of Example 1 in 70 ml. of methylene chloride was added dropwise to a stirred solution of 0.72 g. of triethylamine and 4.0 g. of 3-methyl-1-buten-3-ol in 50 ml. of methylene chloride maintained at ice temperature. Upon completion of the addition (about 90 minutes) the organic solution was washed successively with water and 3 percent hydrochloric acid and evaporated to dryness. The residue was dissolved in ethyl acetate, washed with 5 percent sodium bicarbonate solution, and treated with activated charcoal. The mixture was filtered and the solvent was removed from the filtrate under reduced pressure to give 0.51 g. of 2-(2-methyl-3-butenyl) 3-methyl-7-phenoxyacetamido-$\Delta^2$-cephem-4-carboxylate. The structure was confirmed by the nuclear magnetic resonance spectrum. The neutral and basic washes yield 0.82 g. of a mixture of $\Delta^2$ and $\Delta^3$ acids.

EXAMPLE 3

A solution of 4.16 g. of the ester from Example 2 in one liter of carbon tetrachloride was stirred and purged with nitrogen for 20 minutes. To the solution were then added 2.67 g. of N-bromosuccinimide and 50 mg. of azobis-isobutyronitrile. The solution was stirred and heated under reflux until a negative starch-iodide paper test was obtained (approximately 4½ hours). The solution was cooled overnight in a refrigerator, the excess N-bromosuccinimide was removed by filtration through a cotton plug, and the carbon tetrachloride was evaporated to yield 2-(2-methyl-3-butenyl) 3-bromomethyl-7-phenoxyacetamido-$\Delta^2$-cephem-4-carboxylate which was used in subsequent reactions.

EXAMPLE 4

A solution of 2.48 g. of 2-(2-methyl-3-butenyl) 3-bromomethyl-7-phenoxyacetamido-$\Delta^2$-cephem-4-carboxylate, 2 ml. of morpholine, and 20 ml. of benzene was stirred at 25° C. for two hours. The solution was then washed with 5 percent sodium bicarbonate solution and the organic phase extracted three times with 3 percent hydrochloric acid. The acid solution was adjusted to pH 8 with 5 percent sodium bicarbonate and extracted with methylene chloride. The methylene chloride solution was dried over sodium sulfate and evaporated to dryness to give 0.74 g. of 2-(2-methyl-3-butenyl) 3-morpholinomethyl-7-phenoxyacetamido-$\Delta^2$-cephem-4-carboxylate. A thin layer chromatogram showed this material to be nearly pure.

EXAMPLE 5

A solution of 0.7 g. of the product from Example 4 and 3 ml. of triethylamine in 20 ml. of a mixture of isopropyl and ethyl alcohols was stirred at 25° C. for 2 hours. The solvents were removed under reduced pressure and the residue examined by thin layer chromatography. This showed the presence of two components of similar $R_f$, one of which corresponded to the starting material. The mixture was then stirred in 90 percent formic acid for one hour after which time the formic acid was removed under reduced pressure. The residue was dissolved in water and the pH of the aqueous solution was adjusted serially to 8, 7, and 6 and washed with ethyl acetate after each adjustment. The aqueous solution was evaporated to dryness and the residue was triturated with methanol-acetone to remove the amino acid from the inorganic salts. The organic solvents were removed in vacuo to give 0.25 g. of amino acid. The amino acid was compared on a thin layer chromatogram and in two different solvent systems on paper chromatograms with authentic 3-morpholinomethyl-7-phenoxy-acetamido-$\Delta^3$-cephem-4-carboxylic acid prepared in another way and was found to have a component with identical $R_f$ in all cases. Two bioautographs against *B. subtilis* also verified the presence of the desired $\Delta^3$ acid.

EXAMPLE 6 t-Butyl 3-bromomethyl-7-phenoxyacetamido-$\Delta^2$-cephem-4-carboxylate was prepared following the procedure of Examples 1–3. To a solution of this compound in 50 ml. of ethyl ether was added about 5 ml. of dimethylamine in 20 ml. of ether at ice temperature. The reaction mixture was stirred at 0° C. for three hours. The solvent was removed under reduced pressure and the residue was suspended in ethyl acetate. The ethyl acetate solution was washed twice with aqueous 5 percent sodium bicarbonate solution, then extracted with 3 percent hydrochloric acid. The acidic solution was made basic with 5 percent sodium bicarbonate then extracted with ethyl acetate. The ethyl acetate solution was dried over anhydrous potassium carbonate and evaporated to dryness to give 2.3 g. of product. A nuclear magnetic resonance spectrum showed the product to be pure t-butyl 3 - (N,N-dimethylaminomethyl)-7-phenoxyacetamido-$\Delta^2$-cephem-4-carboxylate.

EXAMPLE 7

The $\Delta^2$ ester from Example 6 was treated with triethylamine in an alcoholic solution as described in Example 5 to isomerize the double bond from the 2-position to the 3-position. Removal of the t-butyl ester group gave 3-(N,N-dimethylaminomethyl) - 7 - phenoxyacetamido-$\Delta^3$-cephem-4-carboxylic acid.

EXAMPLE 8

To a solution of 5 millimoles of the 3-bromomethyl $\Delta^2$ ester from Example 3 in 100 ml. of ethyl ether at ice temperature was added a solution of 2 ml. of dimethylamine in 5 ml. of ether. The solution immediately became lighter in color and a yellow precipitate formed. After 15 minutes at ice temperature the solution was washed with 5 percent sodium bicarbonate solution and the ether was extracted twice with 3 percent hydrochloric acid. The acid extract was adjusted to pH 8 with saturated sodium bicarbonate solution and extracted with benzene. The benzene solution was dried over sodium sulfate and evaporated to dryness to give 0.490 g. of product which was stirred with 5 ml. of pyridine in 20 ml. of isopropanol at 25° C. for 3 hours to complete isomerization. Removal of the solvent under reduced pressure gave 2-(2-methyl-3-butenyl) 3-(N,N-dimethylaminomethyl) - 7 - phenoxyacetamido-$\Delta^3$-cephem-4-carboxylate.

EXAMPLE 9

A solution of 0.300 g. of the ester product from Example 8 in 5 ml. of 90 percent formic acid was stirred at 25° C. for 2 hours. The solution was then evaporated to dryness under reduced pressure. The crude product was examined by a bioautograph to confirm the presence of the expected 3-(N,N - dimethylaminomethyl)-7-phenoxyacetamido-$\Delta^3$-cephem-4-carboxylic acid.

EXAMPLE 10

2-(2-methyl-3-butynyl) 3-(N,N-dimethylaminomethyl)-7-phenoxyacetamido-$\Delta^2$-cephem - 4 - carboxylate was prepared in a manner analogous to that described for the preparation of the corresponding t-butyl and 2-(2-methyl-3-butenyl) esters. To an ice-cold solution of 104 mg. of the methylbutynyl ester in 15 ml. of a 2:1 isopropanol-methylene chloride solvent was added slowly a solution of 94.5 mg. of m-chloroperbenzoic acid in 8 ml. of a 1:1 isopropanol-methylene chloride solvent. After stirring one hour in the cold then one hour at room temperature the solvent was evaporated and the residue taken up in ethyl acetate. Extraction with cold 2.5 percent hydrochloric acid yielded a basic material after work-up. The basic material was dissolved in 2 ml. of 3:1 acetonitrile-dimethylformamide and the solution cooled. To this was added 30 mg. of powdered stannous chloride and, after 20 minutes, 0.1 ml. of acetyl chloride. After stirring 50 minutes in the cold, the reaction mixture was evaporated to dryness, taken up in ethyl acetate and washed twice with sodium bicarbonate solution, once with sodium chloride solution, dried over magnesium sulfate, filtered and evaporated to give 26 mg. of material. This was dissolved in 15 ml. of methanol, 5 mg. of palladium on barium sulfate was added, and the mixture was hydrogenated for one hour. The methanol was evaporated, 3 ml. of 98–100 percent formic acid was added, and the mixture was allowed to stand for 20 minutes. The solution was evaporated to dryness, taken up in methanol, filtered, and evaporated to yield 18 mg. of crude 3-(N,N-dimethylaminomethyl)-7-phenoxyacetamido-$\Delta^3$-cephem-4-carboxylic acid. This material gave a bioactive zone in bioautograms run in two different systems. The product was slightly slower moving than desacetoxy-cephalosporin V in wet methyl ethyl ketone and faster moving than cephaloglycin run in butanol-acetic acid-water.

We claim:
1. A compound having the formula

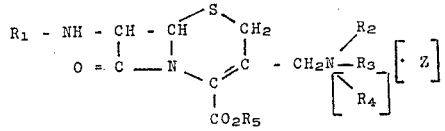

where $R_1$ is hydrogen, hydrogen and a $C_6$ to $C_{12}$ hydrocarbon sulfonic acid,

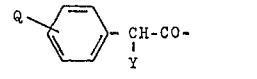

, or

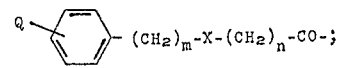

Q is hydrogen, hydroxy, chloro, bromo, $C_1$ to $C_2$ alkoxy, nitro, or cyano;

Y is hydroxyl, amino and pharmaceutically acceptable salts thereof, or protected amino;

$m$ is an integer of 0 to 2;

$n$ is an integer of 1 to 2;

X is oxygen or sulfur;

$R_2$ is hydrogen or $C_1$ to $C_6$ alkyl and $R_3$ is $C_1$ to $C_6$ alkyl or $R_2$ and $R_3$ taken together with the nitrogen to which they are bonded complete a pyrrolidino, piperidino, or morpholino ring;

$R_5$ is hydrogen, a pharmaceutically acceptable cation, $C_4$ to $C_6$ t-alkyl, $C_5$ to $C_8$ t-alkenyl, $C_5$ to $C_8$ t-alkynyl, benzyl, methoxybenzyl, nitrobenzyl, benzhydryl phthalimidomethyl, succinimidomethyl, trimethylsilyl, or phenacyl.

2. A compound as in claim 1 wherein $R_1$ is phenoxyacetyl, $R_2$ and $R_3$ are methyl, and $R_5$ is hydrogen.

3. A compound as in claim 1 wherein $R_1$ is phenoxyacetyl, $R_2$ and $R_3$ together with the nitrogen to which they are attached form a morpholino ring, and $R_5$ is hydrogen.

References Cited
UNITED STATES PATENTS 3,218,318   11/1965   Flynn _____ 260—243 C NICHOLAS S. RIZZO, Primary Examiner U.S. Cl. X.R.

424—246